(No Model.)
J. J. HOGAN.
INTERNAL COUPLING FOR HEATING RADIATORS.
No. 434,710. Patented Aug. 19, 1890.
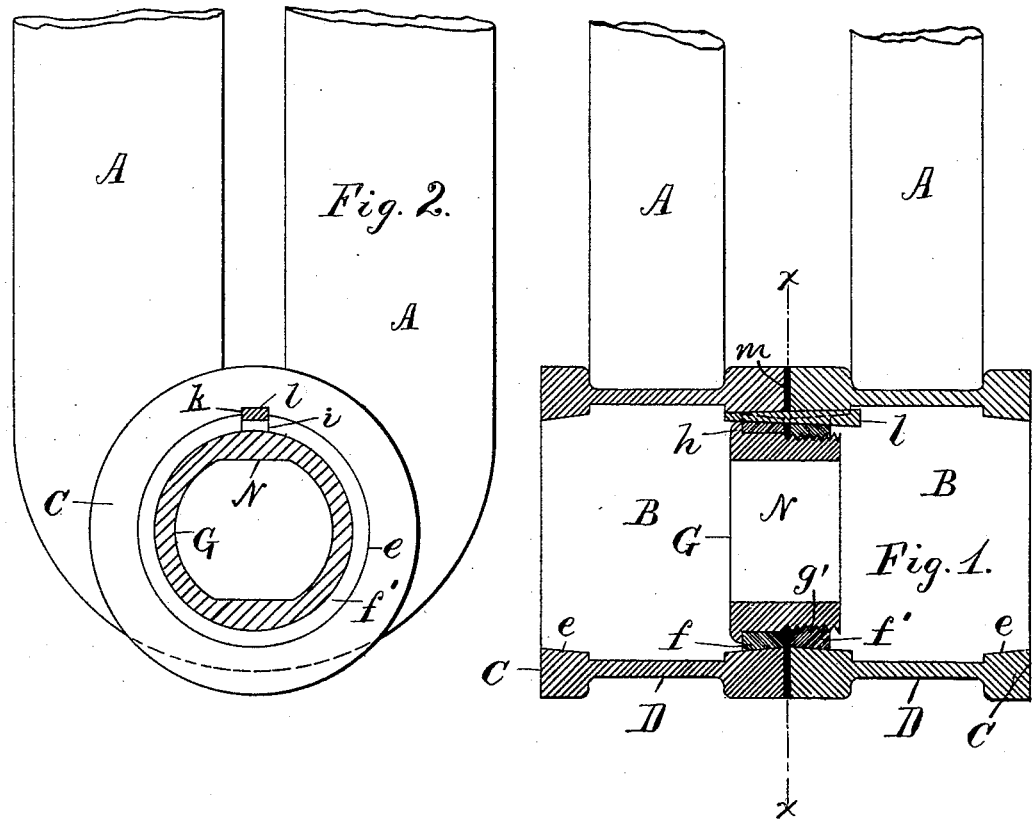
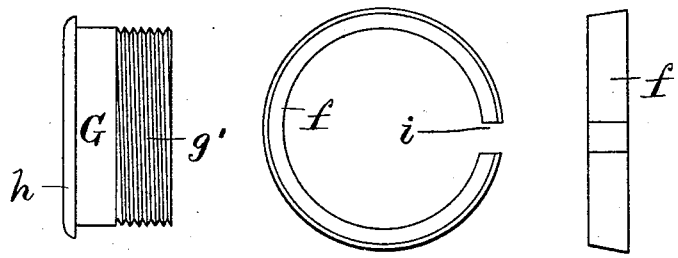
Attest:
L. Lee.
F. C. Fischer
Inventor.
J. J. Hogan, per
Crane & Miller, Attys.

UNITED STATES PATENT OFFICE.

JOHN J. HOGAN, OF BROOKLYN, NEW YORK, ASSIGNOR TO THE HOGAN ENGINEERING COMPANY, OF NEW YORK.

INTERNAL COUPLING FOR HEATING-RADIATORS.

SPECIFICATION forming part of Letters Patent No. 434,710, dated August 19, 1890.

Application filed November 15, 1889. Serial No. 330,448. (No model.)

*To all whom it may concern:*

Be it known that I, JOHN J. HOGAN, a citizen of the United States, residing at Brooklyn, Kings county, State of New York, have invented certain new and useful Improvements in Internal Couplings for Heating-Radiators, fully described and represented in the following specification and the accompanying drawings, forming a part of the same.

This invention is intended to join together, by an internal coupling, hollow radiator-sections having at opposite sides faced seats provided with apertures flared inwardly; and the invention consists in the combination, with such inwardly-flared apertures, of a flanged and threaded bushing inserted inside the same, and conical collars seated in the tapering apertures, and fitted, respectively, to the flange and thread upon the bushing.

In the annexed drawings, Figure 1 represents a central section of two radiator-sections or "loops" united by my coupling, and Fig. 2 shows one of such loops with the coupling in section on the joint-line $x\ x$ in Fig. 1. Fig. 3 is a side view of the bushing alone, and Figs. 4 and 5 are side and end views of one of the conical collars $f$.

A is the body of the radiator-loop broken off above the chamber B for want of room upon the drawings.

C are the opposite faces of the cross-connection D, by which the loops are joined together, and $e$ are the inwardly-flaring apertures by which the hot fluid is introduced within the chamber B and loop A.

Conical collars $f f'$ are fitted to the apertures and formed internally to fit separate parts of the bush G. The bush is formed to pass through the collar $f$ and to tap with the collar $f'$, and is provided with a flange or shoulder $h$ to press one collar toward the other, when the bush is rotated in the thread inside the collar $f'$. The hole N through the bush is of flattened shape to fit the end of a wrench or key. The collars $f f'$ are each divided at one side, thus forming a notch $i$, and a notch $k$ is also formed to match the same in the side of each aperture $e$, and a key $l$ is shown inserted in such notches to hold the collars from rotating. The collars are inserted in their seats in the apertures $e$ by closing the notch $i$, and when fitted therein are allowed to expand, being made in practice thin enough to be elastic, and the bush is then readily inserted behind the collar $f$ from the opposite side of the chamber, and its thread screwed through the same into the collar $f'$. The flange or shoulder $h$ then engages with the side of the collar $f$, and the two collars are drawn firmly together, jamming them tightly in their seats and forcing the opposed faces C into close contact. A packing $m$ is shown fitted between such faces to make a tight joint; but any other means may be used, if desired. The key $l$ prevents the collars from rotating when the bush is turned therein by a wrench, and the collar $f'$ thus acts as a nut to the bush, as desired.

It is immaterial how the bush be formed internally to fit a wrench, and the hole N may therefore be made square or of any other convenient shape.

The key $l$ not only prevents the collars from rotating when the bush is screwed up, but holds the radiator-sections rigidly in their normal position after the joint is formed, which rigid holding of the radiators is not effected by any other form of coupling in which a screw-bush or sleeve is used.

I hereby disclaim my United States Patent No. 411,031, dated September 17, 1889, under which the present invention is a specific construction.

Having thus set forth my invention, what I claim herein is—

1. The combination, with the bush G and conical collars $f f'$, constructed as described, of radiator-sections having opposite faces C, provided with the internally-flared apertures $e$, as and for the purpose set forth.

2. The combination, with a bush G and conical collars $f f'$, provided with a notch $i$, of the radiator-sections having opposite faces C, provided with the internally-flared apertures $e$, and keyway $k$, and the key $l$, fitted to the collars and keyway, as and for the purpose set forth.

In testimony whereof I have hereunto set my hand in the presence of two subscribing witnesses.

JOHN J. HOGAN.

Witnesses:
C. E. CADY,
THOS. S. CRANE.